United States Patent [19]

Ivsin

[11] Patent Number: 4,991,134
[45] Date of Patent: Feb. 5, 1991

[54] CONCURRENT SORTING APPARATUS AND METHOD USING FIFO STACKS

[75] Inventor: Michael Ivsin, Rhinebeck, N.Y.

[73] Assignee: International Business Machines Corporation, Armonk, N.Y.

[21] Appl. No.: 483,286

[22] Filed: Feb. 20, 1990

Related U.S. Application Data

[63] Continuation of Ser. No. 175,077, Mar. 30, 1988, abandoned.

[51] Int. Cl.$^5$ .......................... G06F 7/24; G06F 7/07
[52] U.S. Cl. .................................. 364/900; 340/146.2; 364/962.3; 364/965.4
[58] Field of Search ....................................... 340/146.2; 364/200 MS File, 900 MS File

[56] References Cited

U.S. PATENT DOCUMENTS

| | | | |
|---|---|---|---|
| 4,030,077 | 6/1977 | Florence et al. | 364/900 |
| 4,031,520 | 6/1977 | Rohner | 364/900 |
| 4,053,871 | 10/1977 | Vidalin et al. | 364/900 |
| 4,131,947 | 12/1978 | Armstrong | 364/900 |
| 4,210,961 | 7/1980 | Whitlow et al. | 364/300 |
| 4,514,826 | 4/1985 | Iwata et al. | 364/900 |
| 4,520,456 | 5/1985 | Miranker et al. | 364/900 |
| 4,559,612 | 12/1985 | Vrielink | 364/900 |
| 4,567,572 | 1/1986 | Morris et al. | 364/900 |
| 4,595,995 | 6/1986 | Alles | 364/900 |
| 4,799,152 | 1/1989 | Chuang et al. | 340/146.2 |

Primary Examiner—Lawrence E. Anderson
Attorney, Agent, or Firm—Robert L. Troike

[57] ABSTRACT

The concurrent sorting apparatus and method pertains to a pipelined and concurrent sorting engine that can operate with single or double-ported host memory and, specifically, sort data with serial input and output. The apparatus is composed of stages that can vary in count to provide faster sort convergence or lower complexity. Each stage includes a first comparator and a storage. The first comparator of each stage is responsive to the value of an input element for storing that element in the storage if, for example, the input element value is equal to or greater than the value of the last stored element in that stage and for passing on to the next stage if the incoming element value is less than the value of the last stored element. The output from the storage of the adjacent stages are compared for passing down from stage to stage to the output the element having for the example the lesser value.

26 Claims, 4 Drawing Sheets

FIG.5

CONCURRENT SORTING APPARATUS AND METHOD USING FIFO STACKS

This is a continuation of application Ser. No. 07/175077, filed Mar. 30, 1988, now abandoned.

This invention relates to sorting apparatus and more particularly to concurrent sorting engine with serial data input.

BACKGROUND OF THE INVENTION

Data sorting is a process where starting with "N" random elements, an order is created such that $E_1 < E_2 < E_3 < \ldots E_N$ known as ascending order, or, also $E_N > E_{N-1} > E_{N-2} > \ldots E_1$ known as descending order. The elements can be ordered numerically or logically.

It is desired that the data sorting process be as fast as possible and, to that end, a number of algorithms have been implemented. Some machines process each element one at a time and a significant speed increase can be achieved if many elements can be manipulated concurrently. In general, all "N" elements are not available simultaneously and it is, therefore, desirable to start processing the elements as soon as these become available.

It is desirable that the sorting apparatus or engine has pipelining, concurrency, utilize the host's memory, and has a comparator count that does not limit the sorting capacity. Pipelining is the ability to accept and supply data—continuously one unit of data per fastest machine cycle. Concurrency (sometimes also referred to as parallelism or chaining) is the processing of two or more arithmetic/logical operations at a time. Usually, in order to achieve concurrency, a plurality of dedicated memory modules is used. This, in turn, is costly in terms of product cost, package bulk, power consumption and, above all, limits the sort capacity to that of the dedicated memory. It is therefore highly desirable that the sorting apparatus utilize the host's memory. Many sorting apparatus or engines call for a plurality of comparators. Such count is sometimes tied to a particular quantity such as "C" where a multiple of "C" becomes the maximum number of the elements that can be sorted. It is desirable to provide an apparatus where there is no limit on the sort capacity even with a few comparators. In the prior art such as in U.S. Pat. No. 4,520,456 of Miranker et al entitled "Dual Reciprocating Pipelined Sorter", U.S. Pat. No. 4,131,947 of Armstrong et al entitled "Random Access Digital Sorter", and the U.S. Pat. No. 4,595,995 of Alles entitled "Sort Circuit and Method Using Multiple Parallel Sorts of the Sorted Items," all of these sorting apparatus require a dedicated memory and have a number of comparators where such count determines the maximum number of the elements that can be sorted. U.S. Pat. No. 4,559,612 of Vrielink entitled "Sorting Device for Data Words" is pipelined input, not pipelined as to output, has dedicated memory and is very memory intensive. In the U.S. Pat. No. 4,567,572 of Morris et al entitled "Fast Parallel Sorting Processor", the comparator count does not limit the sorting capacity, but this patent has dedicated memory, the pipelining has delay and is software controlled and believed relatively slow. U.S. Pat. No. 4,210,961 describes a software process for sorting. European Patent Application No. 0149,213 of Hitachi, Ltd. filed Dec. 21, 1984 entitled "Vector Processor" is pipelined, utilizes Host's memory, has no limit on sorting capacity, but is not concurrent. It has a constant convergence toward sort completion, regardless of the data content, that is in proportion to $N*\text{Log}(N)$.

This invention, for random input (source) data, converges toward completion in proportion to $N*\text{Log}(N)/\text{Log}(S)$ where 'S' is the number of stages and having a minimum of two stages. Also, when source data is sorted and contains some random elements as is the case when updating an existing sorted file, the concurrent sorting engine converges toward completion in proportion to N. All logarithms are base 2.

SUMMARY OF THE INVENTION

In accordance with one embodiment of the present invention, a concurrent sorting apparatus for sorting in respectively ascending or descending order a random stream of data elements comprises a plurality of comparator stages, each stage including a first comparator and a storage means. The first comparator of said first stage is responsive to the incoming random data elements for comparing the incoming data element with the last stored data element of that stage and for if the incoming data is respectively greater than or less than the last stored data element value, storing that number in the storage means and if the incoming data element value is respectively less than or greater than the last stored data value passing that data element to be compared with the stored element in the next succeeding stage. The apparatus further includes means for comparing the stored data elements from the storage means of the comparator stages and for if the stored data elements is respectively less than or greater than the stored number in the compared storage means passing the lesser or higher data element to be compared with the stored element in the next succeeding stage.

DESCRIPTION OF ONE PREFERRED EMBODIMENT

Figure 1:
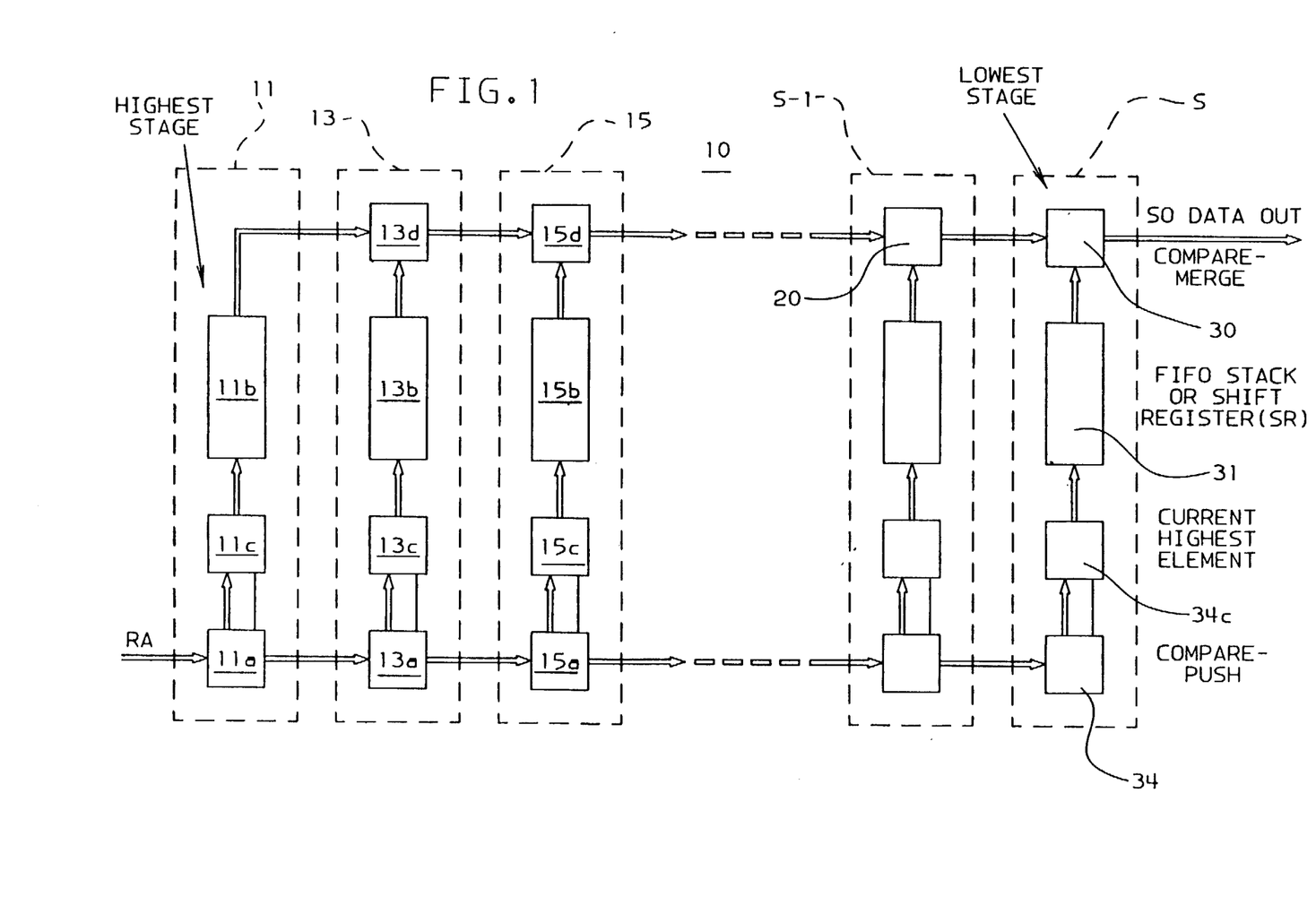
FIG. 1 is a block diagram of one embodiment of the present invention.

Referring to the system 10 of FIG. 1, there is illustrated S stages with the stage 11 nearest the input of the random elements being the first stage. Each stage comprises a comparator, a last element storage for storing and presenting to the comparator the last element stored in the stage, and a FIFO (first in, first out) stack or shift register. Each stage will produce one sorted string with the last input to the FIFO stated being at the bottom and the oldest lowest valued input closest to the output at the top. All of the S stages except the first stage include a comparator for comparing and merging the output from the FIFO stacks or registers for presenting and comparing the lowest valued element of the string at each stage with the corresponding lowest valued element from the previous higher level stage. The comparator passes to the lower level stages those elements which are of a lower number. In the process of data sorting, binary signals are used to represent elements to be sorted and the comparing and passing activities are synchronized such that all stages undergo operations concurrently.

These binary numbers representing elements are applied to the system FIG. 1 at the input marked Ra representing random numbers to be sorted. The random numbers are applied to the first comparator 11a of the first stage represented by 11. At the comparator 11a, the incoming binary number or symbol is compared to the value last previously stored element referred to as the current highest element in the FIFO stack 11b of stage 11 located at current class element storage 11c. If the incoming random element binary value is higher than or equal to the previous highest current element in the stack at 11c, the current element in the current element storage 11c is replaced and pushed up the FIFO stack and the incoming element becomes the current new highest element at storage 11c in stage 11. Therefore, all of the elements in the FIFO stack or shift register are in ascending order from output back to input. The number of FIFO stack store locations or shift registers can be any set number such as, for example, six, and this would be represented by six storage locations or FIFO stacks or shift registers. Each time the input element is higher than or 15 equal to the previous element at the input of comparator 10a, the element is pushed up higher toward the last or output of the stack or register.

If the incoming element at the Ra input to comparator 11 is less than the current highest element at storage 11c that element is passed on to the next lower stage 13. If that element presented at comparator 13a is still less than the highest element in the current element storage 13c, the input element is passed on to the next lower stage 15. If the element presented at comparator 15a is still less than the highest element in the current element stage 15c, the input is passed on. The element continues to move from stage to stage toward the Sth stage. The elements pushed up the stack 13b appear eventually at the output in a first in first output basis and is compared with the element pushed up on a first in first out basis from stack 11b at compare-merge comparator 13d. Similarly, the comparator 15d compares the output from comparator 13d which represents the lowest element from stacks 13b and 11b and the output from stack 15b. This comparison and merge continues concurrently through stages 11, 13, 15 through S at comparators 13d, 15d through 20 and 30 respectively. If the element from the left stage is lower than the element from the neighbor (right) stage, then that element is merged and passed on to the next lower stage until finally the lowest value is passed out of the lowest stage at comparator 30 after comparing the output from the FIFO stack or register 31 of stage S with the output from comparator 20 of stage S-1. If a particular stage is full then the element is passed to the next stage.

An overflow condition occurs when there is an element present in the compare-push stream to the comparator 34 of the lowest stage S and this element was not extracted by any stage and is lower than the current highest at storage 34c and is "out of order." When this occurs all of the elements and all the current highest elements are pushed up the stack and all the current highest are set to zero to allow the input elements to become the current highest elements at storage 34c through 11c, and a flag is set to indicate incomplete condition. When all elements are passed through the engine and incomplete flag is set, then all elements are fed back into the highest stage at comparator 11a for another sorting pass through.

In accordance with this embodiment, the elements are sorted in ascending order with the lowest valued element at the output and the highest valued element at the input. The output could also be read out in reverse order. Also, the operation of the stages could be reversed to provide the highest valued element at the output and in descending order such that if the incoming element was less than the last stored element in the stage, such as at comparator 11a, that element would become the last stored element in the stage (at 11c) and if the element was of a higher value it would be passed to the next stage 13 and the greater valued element at comparator 13d, etc. would be passed toward the output from comparator 30.

Initially, all stages are empty. Thus, a stage will accept at least one element that will become the current highest element. The second or subsequent element that a stage can accept will be greater than or equal the current highest element. For random data, therefore, every time a stage accepts an element the opportunity to accept another element is, on the average, halved.

If 'e' is the average number of elements accepted by a stage then $0 < e = \text{Log}(N)$ for $N >> 1$ where N is the number of random elements offered to a stage. Starting with random data, first pass:—each stage extracts 'e' elements and sorting engine produces strings with an average sorted string length of 'eS' elements.

On second (subsequent) pass ('P') the input elements are no longer random, each stage extracts at least eS elements, and sorting engine sorts at least eS2 (eSP) elements per string.

The number of partially sorted strings, or Runs 'R', after first pass is: $R = N/eS$.

After second pass: $R = N/eS/S = N/eS**2$.

Sorting process is complete if there is just one sorted string (i.e., no overflow)

$1 = R = N/eS**P$.
Solving for P $$P = \frac{\text{Log}(N) - \text{Log}(e)}{\text{Log}(s)}.$$

As 'P' represents the number of passes through sorting engine and as each pass manipulates N elements in N cycles (or operations) then the number of cycles (or operations) 'C' is:

$C = NP = N(\text{Log } N - \text{Log } e)/\text{Log } S$ and and $C = N(\text{Log } N - \text{Log}(\text{Log } N))/\text{Log } S$.

The use of a dedicated storage for a given sorting apparatus facilitates independent sorting activity after the sorting apparatus is loaded with data. However, dedicated storage capability, namely sorting capacity, can be limited by physical constraints such as packaging or by component cost.

Should it be possible for the sorting apparatus to access the RAS (Random Access Storage or RAM) then the additional interfacing circuitry would also access an existing computer resource or resources. The sorting operation would no longer be independent yet can benefit in several ways. The sorting apparatus capacity, namely the maximum number of elements that can be sorted, increases in proportion with the RAS size.

Figure 2:
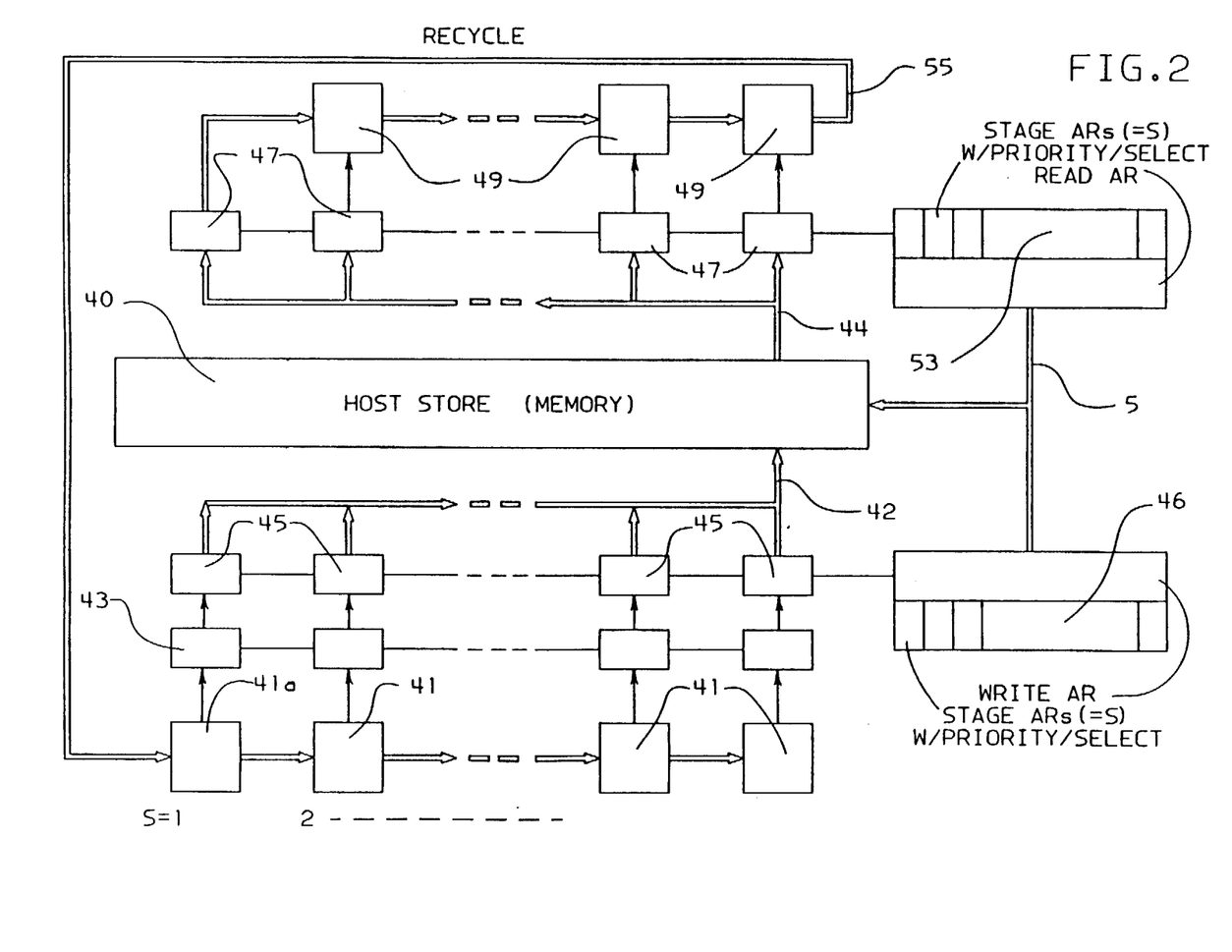
FIG. 2 is a block diagram of the system according to a second embodiment of the present invention using host storage.

The sorting can take advantage of system features such as virtual storage and cache. The sorting apparatus need not be loaded, under program control, with data prior to the commencement of the sorting operations. The addresses within the sorting apparatus are initialized to the value that access, directly, the block of data to be sorted. Referring to FIG. 2, there is illustrated a sorting apparatus according to one preferred embodiment of the present invention. Pursuant to FIG. 2, in the middle there is the RAS (Random Access Storage) or host storage 40 that has a storage capacity equal to 2N where N is the maximum number of elements that can be sorted. Each of the S stages includes comparators 41 and 49, a current or a last highest element storage 43, write data buffer 45, and read data buffer 47. The incoming random elements come from RAS into read data buffers 47, compared at comparators 49 and the lowest is passed via 55. At the first comparator 41a the element is compared to the current highest element in storage 43 and if the input element exceeds that in the current highest storage 43, the new data becomes the current highest element and pushes the previous current highest element to the write data buffer 45 for being written into the host storage 40 via bus 42. As per the previous operation, if the incoming element is less than the current highest element of the stage, it progresses into the next stage comparator, etc., as in the previous operation. The write address registers 46 will send a separate and different address for each stage and each element put on the bus 42 for storing the write data from write data buffer 45 at the host storage 40. The read address registers 53 generate the appropriate addresses for the stages 1 through S to retrieve the elements and sequentially put the stored elements on the corresponding comparator storage 47 for each of the respective stages 1 through S via bus 44. The element values at the comparator storage locations 47 are then compared at output comparators 49 in the same manner as done previously such that if the output from either stage is for the example of lower value than the previous stage, it is pushed forward to the output at 55. As one element appears at 55 one of the read data buffers 47 becomes empty and this one will be refilled via 44 using an address from 53 that is separate and different for each stage. In this manner the system operates as in the previous case but is using the host storage. A more detailed embodiment of the two-stage system is described below in connection with FIG. 3.

Figure 3:
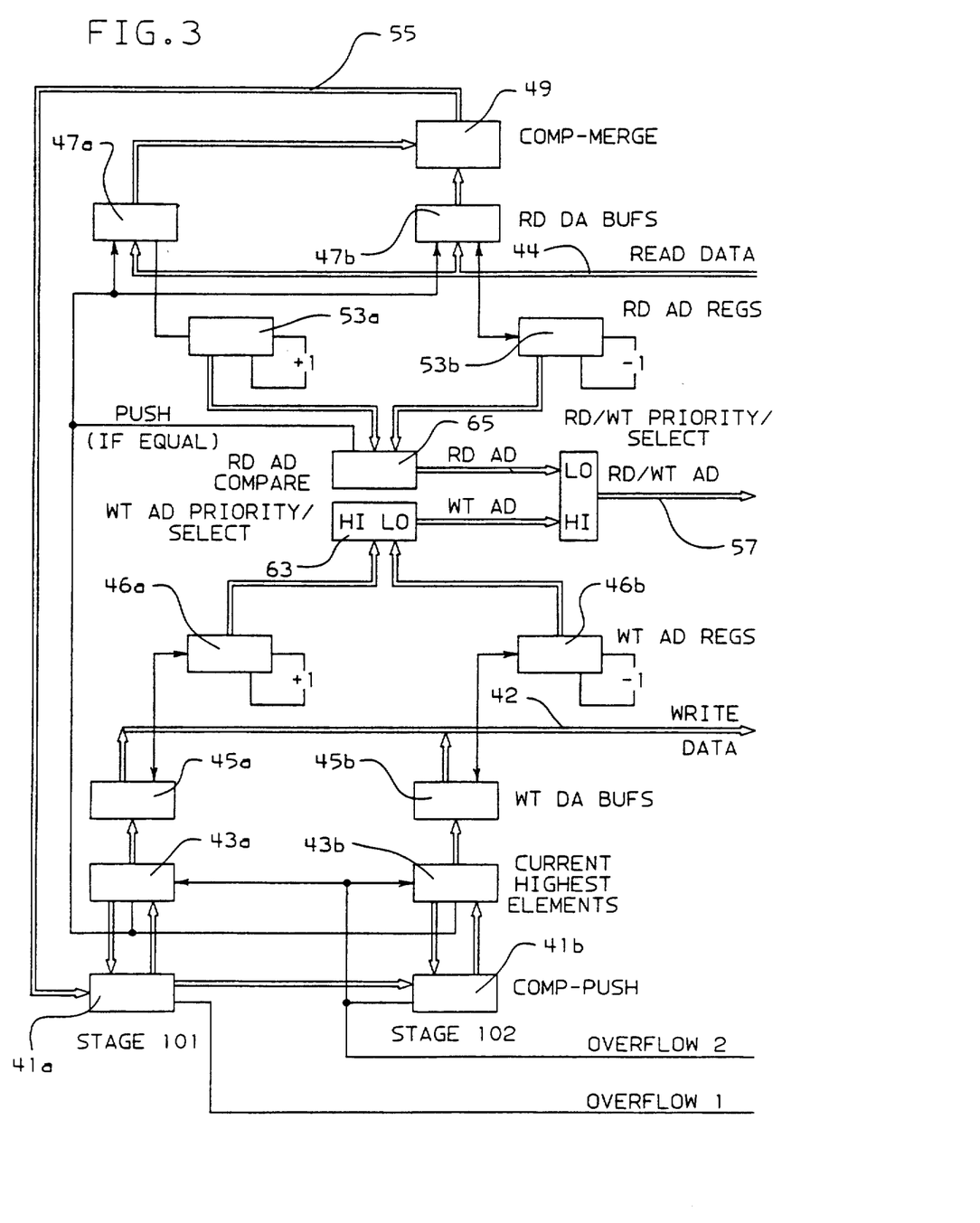
FIG. 3 is a detailed diagram of two stages of the system of FIG. 2.

In the two-stage operation of FIG. 3 there is for the first stage the comparator of 41a and comparator 41b for the second stage. The current highest element for the first stage is stored at storage 43a and for the second stage at storage 43b. The output of storage 43a is applied to a write data buffer 45a and the output of storage 43b is applied to the write data buffer 45b. Associated with stage 101 is a first write address register 46a and associated with stage 102 is a second write address register 46b. In the case where there are two simultaneous elements that are pushed filling both write data buffers 45a and 45b, generating two write requests, the element in Stage 101 will have the highest priority and will be written into the Random Access Storage. Should the subsequent element be accepted into Stage 101 then the same, highest priority, write will be executed. Therefore, the write data buffers will not overflow and pipelining is preserved. Eventually all write data buffers will be empty. The read data buffers will be filled via and read requests.

Single-ported storage accepts only one address at a time. In this case the selector 46b (multiplexer) forwards one address to host storage with write address having higher priority.

Double-ported storage can service two address ports simultaneously. In this case, the selector 46b is not required. Read and write requests will occur simultaneously and an additional sorting speed-up is accomplished.

Figure 4:
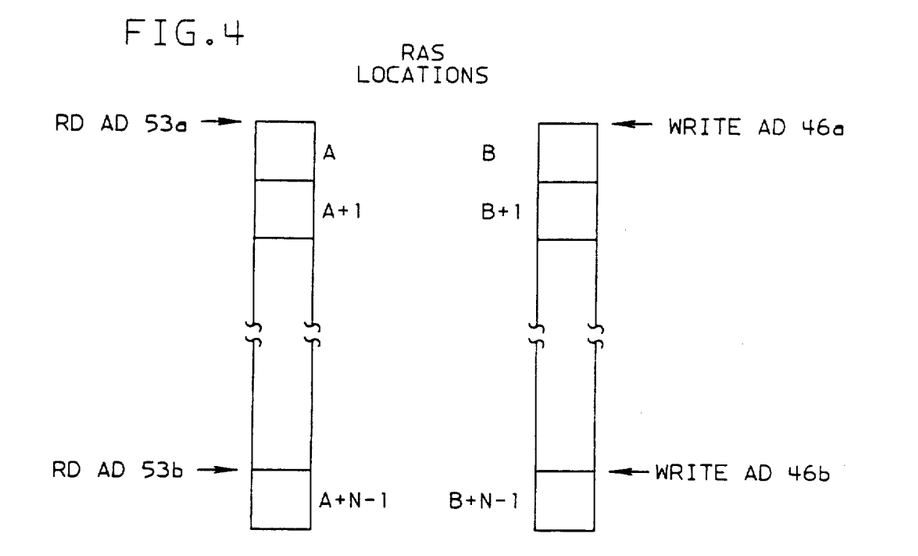
FIG. 4 illustrates the RAS management for initial conditions for the two stage system of FIG. 3.

The Random Access Storage management will be described in connection with FIG. 4. Four addresses will be loaded to the address register represented in FIG. 4. The total Random Access Storage (RAS) allocation will be 2N (N is the number of elements to be stored). The elements in RAS are initially stored in consecutive locations. The read address register 53a will point to the first element at location A and read address register 53b will point to element N at location A+N−1. The write address register 46a will point to a working storage location B and the write address register 46b to location B+N 1. The write address register 46a can be incremented by one and the write address register 46b can be decremented by one. The prioritizing is done at priority select 63 such as the selecting for priority stage 101 over stage 102. The write data is sent over bus 42 with the write address via the output address lead 57. The read data enters along bus 44 to the read data buffers 47a and 47b corresponding to stages 101 and 102 respectively. The read addresses are generated by the read address registers 53a and 53b with read address generator 53a starting at address A for example and read address 53b starts at address A+N−1. The read address register 53a is incremented by one address location after each read request and the read address register 53b is decremented by one address location after each read request starting at the A+N−1 address. These read addresses are compared at comparator 65 and, if equal, all elements are read from storage Incoming data at the read address buffers 47a and 47b are compared at comparator 49 and the lower of the two comparisons is gated out to output 55 and back to the inputs of the first stage 41a.

A review of the sorting process is as follows. Initially, all of the data buffers will be empty and the read requests will be pending. Read data buffers 53a and 53b will be filled and the sorting apparatus will initiate the sorting process. As the elements are accessed from both ends (RAS location A through A+N−1), the read address register 53a will increment following a data fetch command while read address 53b would decrement. When the contents of both read address registers 53a and 53b are equal then a sorting pass is complete, data is sequentially pushed from the read data buffers, current highest element buffers 43a and 43b, and write data buffers 45a and 45b. At this point the content of the write address registers will also be equal but no verification/check need be performed. More than one sorting pass may be required. If there is an overflow from stage 102 another sorting pass will be required. If there is an overflow from stage 101 only, then only one additional sorting pass is required.

To initiate a second sorting pass, the read address register 53a and 53b will be initialized for locations B and B+N −1, respectively. The write address registers 46a and 46b will be initialized for locations A and A+N −1, respectively. Overflow 101 will be reset. Following the second sorting pass, the address registers will be initialized as for the first sorting pass. The address swapping will continue until there is no overflow from stage 101. At this point the sorting process is completed. Note that, in general, the sorted elements can occupy either locations A through A+N−1 or B through B+N−1.

Figure 5:
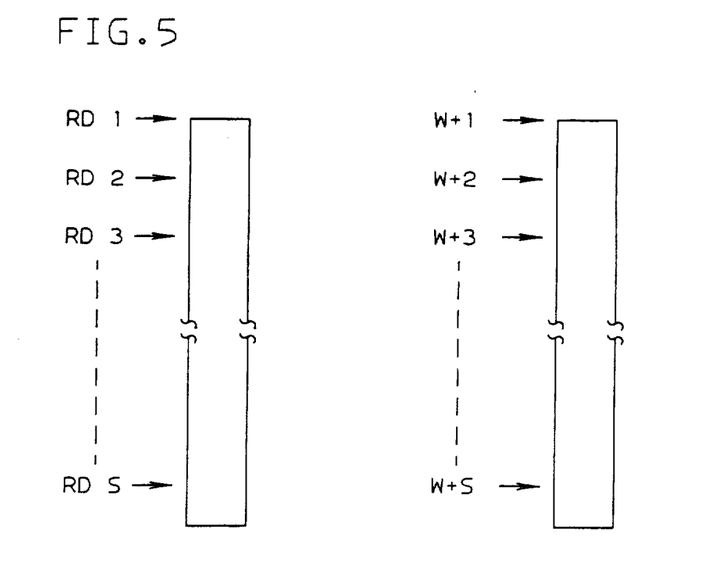
FIG. 5 illustrates the initial pointers in RAS for S stage sorting apparatus.

If there is an overflow from stage 102, an overflow 2 flag is set and the current highest elements will be loaded into the write data buffers and the elements in compare-push circuits reference 41a and 41b will be loaded in (and FIG. 5 illustrates the Random Access Storage management for an S-stage sorting apparatus. The read and write address registers are initialized as shown in FIG. 5. The block of RAS that each read and write address register will span is calculated as N divide by S, truncated. The last block will be increased to accommodate all N elements to be sorted. For example, let N equal 103 and S equal 9. Each stage will access 103 divide by 9 is equal to 11 elements while the last stage will access 15 (8×11+15=103). No read or write address pointer can advance pass the initial value of the next pointer. Namely, read 1 pass initial read 2 or write 2 pass initial write 3. Two times S comparators (S for read and S for write) will be required. Once the limit for a write stage is reached, the writing to RAS will cease for this particular stage during the sorting pass. A stage thus inhibited will pass all elements through to the next stage. Note that a provision must be made to also store the current highest element. Thus, a stage will be considered full when, say, write address N is equal to the initial write address N+1 less one.

Ordinarily, compare-merge process pauses when an element is not present as it is not known which element should be merged. When all elements are read from a particular block, an indication will be given allowing the compare-merge circuit to continue merging elements from other RAS blocks, namely stages, until all elements are read.

In case of an overflow in the last stage, then another sorting pass will be required. The second or subsequent sorting passes require a swap of read and write address pointers in the same way as described for the two-stage sorting engine described previously.

I claim:

1. A concurrent sorting apparatus, for sorting a stream of data elements, each represented by a data value, comprising:
   a plurality of comparator stages where each stage includes a single input comparator and a multiple storage means having a successive series of storage locations,
   said input comparator of each stage being responsive to the value of an input element for either passing the element on to the next stage or storing the element in the first storage location of the storage means of that stage depending on the value of the element, said storage means storing the element on a first in first out basis and for providing only the last stored element for comparison with an incoming element, and
   output comparison means coupled to an output of said storage means for said stages for comparing the data value of the elements out of the last storage location in adjacent stages and for passing down from stage to stage to the output the elements having the selective one of lesser or greater value depending on the desired order.

2. The combination of claim 1 including means responsive to overflow condition where the element cannot be passed down or pushed up for forcing that and other elements at other stages as the current highest element and for causing the elements to be passed again through the sorting apparatus.

3. The concurrent sorting apparatus of claim 1 wherein said storage means includes a host storage and read and write data buffers that hold data elements pending reading form or writing into host storage.

4. The sorting apparatus of claim 3 including a write address priority means for enabling said write addresses from said stages on a priority basis to said host storage.

5. The combination of claim 2 wherein said storage means includes current highest element storage between said input comparator and said write data buffers and including means responsive to overflow condition where the element cannot be passed down or pushed up for moving the content of the current highest element storage to the write data buffers and the content of the first comparators into current highest element storage.

6. The combination of claim 2 wherein said storage means includes means for incrementing and decrementing read and write address registers.

7. The combination of claim 3 wherein said storage means includes means for incrementing and decrementing read and write address registers.

8. A method of storing elements represented by binary numbers comprising the steps of;
   providing a plurality of sorting stages each with comparator means and stack storage means,
   comparing the incoming element with the value of only the element last stored in a stage for passing the element onto the next stage if the value is less than the last stored value in the stage and for storing the incoming element in the stage at the last stored location while pushing up the previously last stored element toward the output of the storage means on a first in first out basis if the value is greater than or equal to the last stored value; and
   comparing the output of the storage means of the adjacent stages for passing the element having the lower value toward the lower stages or output of the system.

9. A method of storing elements represented by binary numbers comprising the steps of;
   providing a plurality of sorting stages each with comparator means and stack storage means,
   comparing the incoming element with the value of only the elements last stored in a stage for passing the element on to the next stage if the value is greater than the last stored value in the stage and for storing the incoming element in the stage at the last stored location while pushing up the previously last stored element toward the output of the storage means on a first in first out basis if the value is less than or equal to the last stored value; and
   comparing the output of the storage means of the adjacent stages for passing the element having the greater value toward the lower stages or output of the system.

10. A concurrent sorting apparatus for sorting a stream of data elements, each represented by a data value comprising:
   a plurality of comparator stages where each stage includes a single input comparator and a multiple storage means having a successive series of storage locations,
   said input comparator of each stage responsive to the value of input element being less than the last stored element in the first storage location of the storage means for passing on to the next stage and being equal to or greater than the last stored element for storing in the first storage location of said storage means of that stage, said storage means storing the element on a first in first out basis and for presenting only the last stored element for comparison with the incoming element, and output comparison means coupled to an output of said storage means for said stages for comparing the data value of the elements out of the last storage location in adjacent stages for passing down from stage to stage to the output the elements having the lesser value.

11. The combination of claim 10 wherein said storage means includes a FIFO buffer.

12. The combination of claim 10 including means responsive to overflow condition where the element cannot be passed down or pushed up for forcing that and other elements at other stages as the current highest element and for causing the elements to be passed again through the sorting apparatus.

13. The concurrent sorting apparatus of claim 10 wherein said storage means include a host storage and read and write data buffers that hold data elements pending reading from or writing into host storage.

14. The sorting apparatus of claim 13 including a write address priority means for enabling said write addresses from said stages on a priority basis to said host storage.

15. The combination of claim 13 wherein said storage means includes current highest element storage between said input comparator and said write data buffer and including means responsive to overflow condition where the element cannot be passed down or pushed up for moving the content of the current highest element storage to the write data buffer and the content of said input comparator into current highest element storage.

16. A concurrent sorting apparatus for sorting a stream of data elements, each represented by a data value comprising:
  a plurality of comparator stages where each stage includes a single input comparator and a multiple storage means having a succfessive series of storage locations,
  said input comparator of each stage being responsive to the value of input element being greater than the last stored element in the first storage location of the storage means for passing on to the next stage and being less than the last stored element for storing in the first storage location of said storage means of that stage, said storage means storing the element on a first in first out basis and for presenting only the last stored element for comparison with the incoming element, and
  output comparison means coupled to an output of said storage means for said stages for comparing the data value of the elements out of the last storage location in adjacent stages for passing down from stage to stage to the output the elements having the greater value.

17. The concurrent sorting apparatus of claim 16 wherein said storage means include a host storage and read and write data buffers that hold data elements pending reading from or writing into host storage.

18. The combination of claim 17 wherein said storage means, includes current highest element storage between said first comparator and said write data buffer and including means responsive to overflow condition where the element cannot be passed down or pushed up for moving the content of the current highest storage to the write data buffer and the content of said input comparator into current highest element storage.

19. The combination of claim 17 wherein said storage means includes means for incrementing and decrementing read and write address registers.

20. The storage apparatus of claim 17 including a write address priority means for enabling said write addresses from said stages on a priority basis to said host storage.

21. The combination of claim 20 including means responsive to overflow condition where the element cannot be passed down or pushed up for forcing that and other elements at other stages as the current highest element and for causing the elements to be passed again through the sorting apparatus.

22. A concurrent sorting apparatus using a host's data storage for sorting a stream of data elements, each represented by a data value comprising:
  a plurality of comparator stages where each stage includes a single input comparator, a current highest element storage for comparing with incoming data elements at said input comparator, and read and write data buffers that hold data elements pending reading from or writing into host storage,
  said input comparator of each stage being responsive to the value of the input element as compared to the value of that stored in said current highest element storage for either passing on to the next stage or storing in said current highest element storage, said data buffers and associated memory locations of the host stage depending on the value of the element, said host storage storing the element on a first in first out basis per stage for presenting at said read data buffer; and
  output comparison means coupled to the output of said read data buffers for said stages for passing from stage to stage to the output the elements having the selective one of lesser or greater value depending on the desired order.

23. A concurrent sorting apparatus using a host's data storage for sorting a stream of data elements, each represented by a data value comprising:
  a plurality of comparator stages where each stage includes a single input comparator, a current highest element storage for comparing with incoming data elements at said input comparator, and read and write data buffers that hold data elements pending reading from or writing into host storage,
  said input comparator of each stage responsive to the value of the input element being less than the value of that stored in said current highest element storage for passing on to the next stage and being equal to or greater than the value in the highest element storage for storing in said current highest element storage, said data buffers and associated memory locations of that stage depending on the value of the element, said host storage storing the element on a first in first out basis per stage for presenting at said read data buffer, and
  output comparison means coupled to the output of said read data buffers for said stages for passing from stage to stage to the output the elements having the lesser value.

24. The storage apparatus of claim 23 including a write address priority means for enabling said write addresses from said stages on a priority basis to said host storage.

25. The combination of claim 24 including means responsive to overflow condition where the element cannot be passed down or pushed up for forcing that and other elements at other stages as the current highest element and for causing the elements to be passed again through the sorting apparatus.

26. The combination of claim 25 wherein said storage means includes current highest element storage between said input comparator and said write data buffer and including means responsive to overflow condition where the element cannot be passed down or pushed up for moving the content of the current highest element storage to the write data buffer and the content of input comparator into current highest element buffers.

* * * * *